United States Patent Office 3,755,485
Patented Aug. 28, 1973

3,755,485
HYDROCARBON ALKYLATION PROCESS
Jay E. Sobel, Des Plaines, Ill., assignor to Universal
Oil Products Company, Des Plaines, Ill.
No Drawing. Filed July 30, 1971, Ser. No. 167,790
Int. Cl. C07c 3/54
U.S. Cl. 260—671 R          8 Claims

ABSTRACT OF THE DISCLOSURE

A process is disclosed for alkylating an alkylatable hydrocarbon reactant with an olefin-acting reactant utilizing an alkylation catalyst diluted with from about 0.001 wt. percent to about 40 wt. percent, based on the catalyst, of a catalyst diluent derived from a terpene or mixture of terpenes. The catalyst diluent is formed by reacting a terpene, or mixture of terpenes, with an alkylation catalyst.

BACKGROUND

This invention relates to a process for alkylating an alkylatable hydrocarbon reactant with an olefin-acting reactant to produce a higher molecular weight alkylation reaction product. More specifically, this invention relates to an alkylation process, utilizing an alkylation catalyst diluted with a catalyst diluent derived from a terpene, or mixture of terpenes, to produce a higher molecular weight product from a lower molecular weight alkylatable hydrocarbon and a lower molecular weight olefin-acting compound. The diluent is produced by reacting a terpene, or mixture of terpenes, with the alkylation catalyst. In one aspect, this invention relates to a process for alkylating an isoparaffinic hydrocarbon with an olefinic hydrocarbon, said olefinic hydrocarbon having from about 3 to about 5 carbon atoms per molecule, to produce high octane motor fuel components, which process utilizes a hydrogen fluoride catalyst diluted with from about 0.001 wt. percent to about 40 wt. percent of a catalyst diluent derived from a terpene.

The alkylation reaction of isoparaffins with olefins is used by the petroleum refining industry to produce high octane motor fuel blending stocks from light isoparaffins and olefins that are, themselves, of little economic value. The octane rating of the alkylation reaction product, or alkylate, may readily be improved by the addition of alkyl lead compounds, e.g., tetraethyl and tetramethyl lead, and with the octane rating increase provided by addition of alkyl leads, alkylate is useful as a blending stock for upgrading other lower octane fuel components. Because of the present trend away from using alkyl leads to upgrade motor fuels, there is an increasing demand for very high octane alkylate which can be used to provide octane values in motor fuels without addition of lead compounds. The trend away from using lead compounds as motor fuel additives has also resulted in a decrease in the economic utility of alkylate having only a moderately high octane rating which has typically been produced in prior art alkylation processes. The process of this invention makes possible the production of alkylate having an octane rating superior to that produced by previously disclosed alkylation processes, thereby providing a method for producing alkylate useful for blending in unleaded fuels.

Motor fuels alkylate is generally produced by alkylating isobutane with propylene and butenes. Heavier isoparaffins and olefins may be employed to produce alkylate, but are not normally alkylated, since they can be more economically utilized in other ways. The alkylation reaction is catalyzed by hydrogen fluoride or sulfuric acid. The reaction is strongly exothermic, and the distribution of reaction products has been found to be sensitive to the temperature at which the process is conducted. In producing motor fuel alkylate of high octane, it is desirable to maximize the yield of more highly branched products, and to minimize the yield of straight-chain and less branched alkylate. For example, in the alkylation reaction between isobutane and butenes, the most desirable products are the trimethylpentanes, which have unleaded research octanes of about 100 and higher, while n-octane and the dimethylhexanes, with their much lower octane ratings, are considered to be undesirable products. Aside from the process temperature, various other factors have been found to influence the quality of the alkylate produced in commercial sulfuric acid and hydrogen fluoride-catalyzed alkylation processes, including the isoparaffin/olefin concentration ratio in the alkylation zone, the efficiency of mixing of reactants with catalyst, etc. Among the factors found to be of importance in producting high quality alkylate has been the absence or presence, in the catalyst, of certain inorganic and/or organic compounds such as water and high molecular weight polymer of the olefin to be alkylated. It has been found that the quality of alkylate can be improved by maintaining a certain concentration of such compounds in the catalyst.

However, as noted above, there is now a demand for an alkylate product having properties superior to the product which is produced by prior art processes, including those which use previously known catalyst diluents. I have discovered that, by utilizing a catalyst diluent, hereinafter more fully described, which is created from a terpene, or mixture of terpenes, it is possible to provide an alkylate product possessing the higher octane rating necessary to meet the present demand.

Liquid-catalyzed alkylation processes are also important in the creation of certain alkylaromatic hydrocarbons used to produce biodegradable detergents. In such processes, generally, benzene is alkylated with $C_{10}$–$C_{20}$ normal olefins or alkyl halides using such catalysts as aluminum chloride-hydrogen chloride, hydrogen fluoride and sulfuric acid. In order to achieve an economical operation in such alkylation processes, it is important that the desired reaction product be produced in relatively high purity and that undesirable side products, such as polymers of the olefins and alkyl halides or polyalkylaromatics, be minimized. By utilizing the terpene-based catalyst diluent herein disclosed, aromatic alkylation processes may be improved and a more economical operation achieved.

SUMMARY

It is an object of this invention to provide an alkylation process for producing high octane motor fuel components. Another object of this invention is to provide an alkylation process for producing alkylaromatic hydrocarbons. A particular object of this invention is to provide a process for producing an isoparaffin-olefin reaction product having a very high unleaded octane rating and useful as a motor fuel blending component.

In an embodiment, this invention relates to a process for alkylating an alkylatable hydrocarbon reactant with an olefin-acting reactant to provide an alkylation reaction product, which process comprises: reacting said alkylatable reactant with said olefin-acting reactant in an alkylation zone at alkylation conditions in contact with an alkylation catalyst, containing from about 0.001 wt. percent to about 40 wt. percent, of a catalyst diluent derived from a terpene, and recovering said alkylation reaction product from the effluent from said alkylation zone.

In a specific embodiment, this invention relates to a process for alkylating isobutane with a mixture of olefins, comprising equal amounts, by weight, of propylene, 1-butene, 2-butene and isobutylene, to provide branched chain hydrocarbons having from about 7 to about 8 carbon atoms per molecule, which process comprises: reacting isobutane with said mixture of olefins in an alkylation zone at alkylation conditions in contact with hydrogen fluoride and with 10 wt. percent, based on said hydrogen fluoride, of a catalyst diluent derived from a terpene, and recovering said branched chain hydrocarbons from the effluent from said alkylation zone.

Further objects and embodiments of the process of this invention will be apparent to one skilled in the art from the foregoing and from the following detailed description of this invention.

DETAILED DESCRIPTION

The process of this invention may be applied to the alkylation of such alkylatable reactants as isobutane, 2-methylbutane, 2-methylpentane, 3-methylpentane, 2,2-dimethylbutane, and higher molecular weight isoparaffinic hydrocarbons. This process is also applicable to the alkylation of such alkylatable reactants as benzene, toluene, etc. The preferred isoparaffinic reactant is isobutane, and the preferred aromatic reactant is benzene.

The olefin-acting reactants to which this process is applicable include straight and branched chain olefins having from about 3 to about 20 carbon atoms per molecule. The olefins preferred for use in this process when applied to the alkylation of isoparaffins are propylene, 1-butene, 2-butene and isobutylene. The olefins preferred for use when the process of this invention is applied to the alkylation of an aromatic hydrocarbon include $C_{10}$–$C_{15}$ normal olefins, particularly those in which the olefinic bond is between the second and third carbon atoms in the chain. Other olefin-acting reactants which may suitably be utilized in this process include $C_3$ to $C_{20}$ alkyl halides, alkyl sulfates, alcohols, esters, ethers, and alkyl phosphates. Commonly used sources of the alkylatable reactants and olefin-acting reactants suitable for use in this alkylation process contain other hydrocarbons and inorganic gases, for example, hydrogen, nitrogen, methane, ethane, etc. The reactants may be utilized in the process of this invention as diluted by these gases and hydrocarbons.

The liquid alkylation catalysts suitable for use in the process of this invention are those which have been utilized in previously disclosed alkylation processes, and which are well known to those skilled in the art. One such suitable catalyst is substantially anhydrous sulfuric acid. Another suitable catalyst, preferred for use in the process of this invention, is hydrogen fluoride. Typically, the hydrogen fluoride catalyst employed in alkylation processes contains less than about 5% water. It is preferred, but not essential, that hydrogen fluoride catalyst utilized in the practice of the present invention contain less than about 2% water. The catalyst employed in the present process may be combined with catalyst-soluble hydrocarbons other than the terpene-based catalyst diluent. For example, in a typical hydrogen fluoride-catalyst alkylation process for alkylating an isoparaffin with an olefin, the hydrogen fluoride catalyst may contain portions of dissolved isoparaffin, olefin, or polymers of the olefin. The presence of such diluents in the catalyst is intended to be within the scope of this invention. In using the preferred hydrogen fluoride catalyst, it is preferred that water and other diluents, aside from the terpene-based diluent and alkylatable hydrocarbons, comprise no more than about 30 wt. percent of the catalyst, based on the amount of pure hydrogen fluoride in the catalyst. Other liquid alkylation catalysts suitable for use in the process of this invention include, for example, boron trifluoride, aluminum chloride-hydrogen chloride, phosphoric acid, fluorosulfonic acid, etc.

The terpene-based catalyst diluent to be utilized in the process of this invention may be prepared from a noncyclic, monocyclic or polycyclic terpene or a mixture thereof. Examples of suitable terpenes include alpha, beta and gamma terpenes, alpha and beta phellandrenes, d-limonene, terpinolene, pseudolimonene, d-sylvestrene, d-, l-, and dl-camphene, thujene, sabinene, carene, alpha and betal pinene, myrcene, dipentene, etc. The above-listed terpenes are not intended to exclude, as inapplicable, terpenes not enumerated, but to serve only as examples of suitable terpenes. The scope of the process of this invention is intended to include catalyst diluents prepared from any terpene or mixture thereof. For example, a suitable source of terpenes for use in the preparation of the catalyst diluent herein described is a commercially available turpentine, which comprises a mixture of various terpenes, with minor amounts of other hydrocarbons.

One suitable method of preparation, or derivation, of the terpene-based catalyst diluent is by contacting the terpene, or terpene mixture, with an alkylation catalyst in an alkylation zone before the termination of an alkylation process. For example, the terpene, or mixture of terpenes, and the catalyst may be introduced to an alkylation zone prior to the introduction of reactants therein. Alternately, the terpene, or terpene mixture, may be introduced to the alkylation zone after the reactants and catalysts have been contacted therein but before the reactants and catalyst have been withdrawn. Another suitable method for preparing the catalyst diluent is by contacting a terpene, or a mixture of terpenes, with a liquid catalyst in a suitable vessel for a time sufficient to complete the formation of the diluent, separating the catalyst-insoluble materials from the catalyst and catalyst-soluble materials, and subsequently recovering the catalyst-soluble materials as the terpene-based catalyst diluent for use in the process of this invention. Alternatively, the above procedure may be followed except that the catalyst and catalyst-soluble materials are used, without further treatment, in the alkylation process of this invention, rather than separating out the catalyst-soluble materials from the catalyst for subsequent use.

The preparation, or derivation, of terpene-based catalyst diluent utilized in this process may be effected in any suitable manner. The diluent consists, substantially, of polymers of the particular terpene or terpenes utilized in its preparation which are soluble in the catalyst to be utilized in a particular embodiment of the process. In the preparation of the diluent, it is preferred that lower molecular weight polymers of the terpenes and any other lower molecular weight hydrocarbons produced, be separated from the catalyst diluent before it is utilized in this process. When the terepene-based catalyst diluent is prepared by, for example, adding a terpene, or mixture of terpenes to the to the catalyst or reactants during the operation of a conventional alkylation reaction scheme, the product of the alkylation process may be contaminated by side products created by the reaction of the terpene in contact with the catalyst. Thus it is preferable to produce and purify the diluent in one step and subsequently utilize it in the alkylation process, although, as noted above, the diluent may be produced by contacting a terpene with the catalyst and reactants during the alkylation process, or similarly, by contacting a terpene with the catalyst in an alkylation zone, such as a conventional reactor-settler, and subsequently introducing the alkylation reactants to the alkylation zone.

The process of the invention may be embodied in a batch or continuous operation or any other suitable operation. In a batch operation, the catalyst and reactants are charged to a reactor and contacted therein for a time sufficient to effect the alkylation reaction. The catalyst diluent may be introduced to the reactor with the catalyst, the alkylatable reactant, the olefin-acting reactant or a combination thereof. After the catalyst diluent and reactants have been contacted for the desired period of time at proper temperature and pressure, the reaction mixture is withdrawn from the reactor and the catalyst and diluent are separated from the alkylation reaction products and unconsumed reactants. The reaction products are further separated from the unconsumed reactants and recovered. In a continuous operation, catalyst, diluent and reactants are continuously charged to an alkylation reactor, and reaction mixture is continuously withdrawn. As in the batch operation, the terpene-based catalyst diluent may be introduced into the reactor with the catalyst, the alkylatable reactant, the olefin-acting reactant, or any combination thereof. Means for separating the various components of the reaction mixture in the effluent from a batch, continuous or other reactor are well known. These include, for example, settling and phase separation and fractionation.

Alkylation conditions which may suitably be maintained when this process is applied to the alkylation of an isoparaffin with a $C_3-C_5$ olefin, alkyl halide, etc., include a temperature in the range from about 0° F. to about 200° F., preferably from about 25° F. to about 150° F., and a pressure in the range from about 1 atmosphere to about 40 atmospheres. The volume ratio of catalyst to reactants and reaction products in the alkylation zone is maintained in the range from about 0.1 to about 10. A molar ratio of alkylatable reactant to olefin-acting reacting in the range from about 1:1 to about 25:1 is maintained in the alkylation zone. The reactants, catalyst and other components of the reaction mixture formed in the alkylation zone should be contacted therein for a period of about 0.5 minute to about 30 minutes.

Alkylation zones suitable for use in the process of this invention are well known in the art. Any sort of alkylation reactor, reactor-settler combination, reactor-fractionator combination, etc., is suitable. In general, a suitable alkylation zone provides a vessel which will contain the reactants, catalyst and diluents at alkylation conditions, and, typically, provides means for intimately contacting the catalyst with the reactants. Such contacting means include, for example, perforated trays, baffle sections, jet nozzles, column packing, etc.

Suitable alkylation conditions when the process of this invention is applied to the alkylation of an aromatic hydrocarbon with a $C_{10}-C_{15}$ olefin, alkyl halide, etc., are substantially the same as those suitable in isoparaffin alkylation.

Example 1

This example is intended to illustrate one method for preparing the terpene-based diluent to be utilized in the process of this invention.

400 grams of anhydrous hydrogen fluoride were charged to a monel-lined 2 liter reaction vessel having mechanical stirring and heating means and capable of containing reactants at greater-than-atmospheric pressures. 700 grams of commercially available, technical grade, substantially water-free spirits of turpentine, having a specific gravity of 0.87 at 60° F., were subsequently charged to the reactor. The reactor was pressurized to 6.8 atmospheres by the addition of nitrogen. The contents of the reactor were heated to 150° F., held at that temperature and stirred for one hour, and then cooled to 75° F. The contents were allowed to stand in the reactor for one half hour without stirring. Excess pressure in the reactor was then released. It was found that the contents of the reactor had separated into an upper layer, or phase, comprising substantially all hydrocarbons, and a lower layer containing substantially all the hydrogen fluoride in the reactor. The upper, hydrocarbon layer was removed from the reactor, and an amount of n-pentane was charged which was equal in volume to the volume of the contents remaining in the reactor after the removal of the upper, hydrocarbon layer. The reactor was sealed and stirred for 15 minutes and then the contents were allowed to stand unstirred for 15 minutes. The reactor was unsealed, and a second upper, hydrocarbon layer was observed and removed from the reactor. An amount of water was then charged which was equal in volume to the volume of the contents of the reactor after the removal of the second upper hydrocarbon layer. The contents were stirred 15 minutes, and then allowed to stand unstirred for 15 minutes. A lower, water-containing layer and an upper, diluent-containing layer were observed to have formed in the reactor. The water-containing layer, or phase, was removed from the reactor. An amount of a 5 wt. percent aqueous solution of sodium carbonate, equal in volume to the remaining contents of the reactor, was charged to the reactor. The contents of the reactor were stirred for 15 minutes and then allowed to stand unstirred for 15 minutes. A lower water-containing layer, or phase, was removed from the reactor. The contents remaining in the reactor were analyzed to determine the basicity thereof, and the pH of the contents was determined to be 7.5. The contents of the reactor were removed and placed in a fractionation column. The column was sealed and a pressure of 25 mm. Hg was maintained in the column. The contents were heated and the vapors generated were withdrawn until the temperature of the vapors generated, at 25 mm. Hg pressure, was 98° F. The column was then returned to room temperature and pressure, and the catalyst diluent was withdrawn.

Catalyst diluent, prepared as described above, was admixed with hydrogen fluoride to provide a mixture containing, by weight, 89% hydrogen fluoride, 10% catalyst diluent and 1% water. A portion of the mixture was charged to a conventional alkylation reactor. Isobutane and 1-butane were charged to the alkylation reactor at an isobutane/1-butene mole ratio of 12:1. A catalyst to hydrocarbon weight ratio of 1:1 was maintained in the alkylation reactor. The reactor was maintained at 70° F. and 14 atmospheres pressure. Contact time in the alkylation zone was maintained at 10 minutes. The effluent from the reactor was subsequently processed in a conventional manner to recover the alkylation reaction product. The alkylate produced was analyzed and found to have a motor octane number of 93.3.

A catalyst diluent derived from isobutylene was admixed with another portion of hydrogen fluoride to provide a second mixture containing, by weight, 89% hydrogen fluoride, 10% catalyst diluent and 1% water. Isobutane and 1-butane were alkylated under conditions identical to those described above except that the isobutylene-based catalyst diluent was substituted for the terpene-based catalyst diluent. The alkylation reaction products were recovered and analyzed in a manner identical to that used previously. The alkylate thus produced was found to have a motor octane number of only 92.2.

Example II

Hydrogen fluoride containing 1% water is circulated through a conventional alkylation reactor-settler system. The hydrogen fluoride is maintained at a temperature of 125° F. and a pressure of 7 atmospheres. Dipentene is charged continuously to the reactor and admixed with the hydrogen fluoride. Portions of hydrogen fluoride are withdrawn and analyzed periodically to determine the weight percent of organic materials in solution in the acid. When the weight percent of organic materials in solution in the hydrogen fluoride reaches 10%, the introduction of dipentene into the reactor-settler system is discontinued, and any hydrocarbons insoluble in the hydrogen fluoride are withdrawn from the system. Subsequently, the temperature of the catalyst and diluent is reduced to 75° F., and a mixture of isobutane and butenes is continuously introduced into the reactor at an isobutane olefin mole ratio of 15:1. A contact time in the reactor of 10 minutes is maintained, at an acid to hydrocarbon volume ratio of 1:1. The hydrocarbon phase produced in the settler is continuously withdrawn, and an alkylate suitable as a motor fuel is separated therefrom by fractionation. The alkylate is analyzed and found to have a motor octane higher than alkylate produced in the same system under conditions which were identical except that the catalyst did not contain a diluent derived from a terpene.

I claim as my invention:

1. A process for alkylating an alkylatable hydrocarbon reactant with an olefin-acting reactant to provide an alkylation reaction product which comprises: reacting said alkylatable reactant with said olefin-acting reactant, in an alkylation zone at alkylation conditions, in contact with an alkylation catalyst and with from about 0.001 wt. percent to about 40 wt. percent based on said catalyst, of a catalyst diluent prepared by contacting said catalyst with a terpene-containing hydrocarbon comprising a terpene, a mixture of terpenes or turpentine and recovering said alkylation reaction product from the effluent from said alkylation zone.

2. The process of claim 1 further characterized in that said liquid catalyst comprises hydrogen fluoride.

3. The process of claim 1 further characterized in that said liquid catalyst comprises sulfuric acid.

4. The process of claim 1 further characterized in that said alkylatable reactant is isobutane or isopentane and said olefin-acting reactant is a mono-olefinic hydrocarbon having from about 2 to about 5 carbon atoms per molecule.

5. The process of claim 1 further characterized in that said alkylatable reactant is benzene and said olefin-acting reactant is a mono-olefinic hydrocarbon having from about 10 to about 20 carbon atoms per molecule.

6. The process of claim 1 further characterized in that said catalyst and said terpene-containing liquid are contacted in said alkylation zone before the termination of said process.

7. The process of claim 1 further characterized in that said olefin-acting reactant has from about 2 to about 20 carbon atoms per molecule and is an alkyl halide, alkyl sulfate, alcohol, or alkyl phosphate.

8. A process for alkylating an alkylatable hydrocarbon reactant with an olefin-acting reactant to provide an alkylation reaction product which comprises: reacting said alkylatable reactant with said olefin-acting reactant, in an alkylation zone at alkylation conditions, in contact with an alkylation catalyst and with from about 0.001 wt. percent to about 40 wt. percent, based on said catalyst, of a catalyst diluent prepared by contacting alkylation reaction catalyst with a terpene-containing hydrocarbon comprising a terpene, a mixture of terpenes or turpentine, and recovering the resulting organic compounds, soluble in said alkylation reaction catalyst, as said catalyst diluent and recovering said alkylation reaction product from the effluent from said alkylation zone.

References Cited
UNITED STATES PATENTS

| | | | |
|---|---|---|---|
| 2,322,664 | 6/1943 | Russell | 260—683.63 |
| 3,231,633 | 1/1966 | Kramer | 260—683.51 |
| 3,408,419 | 10/1968 | Herber et al. | 260—683.51 |
| 3,538,183 | 11/1970 | Hervert | 260—683.59 |

CURTIS R. DAVIS, Primary Examiner

U.S. Cl. X.R.

260—671 C, 683.51, 683.63